United States Patent [19]

Reich et al.

[11] 4,448,300
[45] May 15, 1984

[54] DEVICE FOR BLOCKING CONTAINERS AGAINST MOVING ON A CONVEYOR

[75] Inventors: Gerhard Reich, Bernhardswald; Michael Wenner, Neutraubling, both of Fed. Rep. of Germany

[73] Assignee: Krones Aktiengesellschaft Hermann Kronseder Maschinenfabrik, Neutraubling, Fed. Rep. of Germany

[21] Appl. No.: 341,399

[22] Filed: Jan. 21, 1982

[30] Foreign Application Priority Data

Jan. 28, 1981 [DE] Fed. Rep. of Germany ....... 3102669

[51] Int. Cl.³ .............................................. B65G 47/74
[52] U.S. Cl. ..................................... 198/633; 198/491
[58] Field of Search ............... 198/491, 459, 451, 425, 198/633, 634, 345, 368; 193/32, 40

[56] References Cited

U.S. PATENT DOCUMENTS 2,108,522  2/1938  Bergmann ......................... 198/451
2,297,968  10/1942  Lyon ................................. 198/491
2,936,062  5/1960  Wilcox .............................. 198/633

Primary Examiner—Joseph E. Valenza
Assistant Examiner—Jonathan D. Holmes
Attorney, Agent, or Firm—Wheeler, House, Fuller & Hohenfeldt

[57] ABSTRACT

For blocking containers that are moving on a conveyor between parallel guide rails, a rotatable star wheel is positioned adjacent the container path. A locking member selectively locks the star wheel in a neutral position wherein it lies completely outside of the container path and in a blocking position wherein it is rotated to block containers. When the star wheel becomes unlocked at neutral position, a rotary device causes the wheel to rotate sufficiently for one of its arms to project into the container path so the moving containers will force further rotation until the wheel becomes locked automatically in the blocking position.

8 Claims, 2 Drawing Figures

DEVICE FOR BLOCKING CONTAINERS AGAINST MOVING ON A CONVEYOR

BACKGROUND OF THE INVENTION

This invention relates to a device for blocking and unblocking movement of containers, such as bottles, that are guided to move along a longitudinal path on a conveyor.

A known type of blocking device that is located in front of the entrance to a labeling machine for containers uses a freely rotatable star wheel whose arms enter between successive containers which results in the wheel being in continual rotation under the influence of the containers being conveyed. The star wheel is locked when it is desired to stop movement of transportation of the containers without stopping the conveyor. A locking device of this kind, wherein the arms of the star wheel rotate synchronously with the containers, provides for stopping the containers without damage, even at high transportation speeds. One desirable feature of the prior art container blocking device is that it requires relatively low actuating and holding force. A disadvantage is that the arms of the rotating star wheel disturb container movement. For instance, when there is a variation in the spacing between consecutive moving containers, knocking of the containers against each other and against the guide rails on the conveyor occurs and an undesirable increase in noise level results.

Another prior art blocking apparatus for containers such as bottles or conveyors uses a locking arm that is provided with a wedge-shaped lug positioned swingably laterally of the guide rails for alternately moving into blocking position where the lug is interposed in the conveyor path or in a neutral position in which it moves clear of the conveyor path to permit the stream of containers to pass. The blocking device is actuated with a pneumatic cylinder that has a spring return. Because the blocking arm is not synchronized with container movement the lug enters the conveyor path in a random fashion and actually travelling transversely to the direction of container movement. For this blocking device the chance of the containers being crushed or pushed over is increased.

SUMMARY OF THE INVENTION

One object of the present invention is to provide a device for blocking movement of containers, such as bottles, on a conveyor that uses a star wheel to obtain blocking but maintains the star wheel completely out of the path of the containers when they are flowing along on the conveyor under normal operating conditions to thereby eliminate the possibility of the blocking star wheel contributing to the production of noise continuously.

Another object is to provide for positively locking the star wheel in neutral position in opposition to a low biasing force that tends to rotate the star wheel such that when the star wheel is unlocked at neutral position the force will initiate rotation of the star wheel to enter one of its arms in the space between conveyed containers and then continue to rotate synchronously with the containers under the force of their movement until the wheel is automatically locked for the arm to block container movement.

Another object is to impose the equivalent of a frictional drag on the star wheel when it has been turned through an initial angle at which the arm enters the conveyor path so the arm will be maintained in a set position where it is ready to block if it is signalled to block if containers arrive in cases where no containers are presently passing the blocking devices.

Still another object of the invention is to provide a simple means for locking and releasing the star wheel at neutral position of the star wheel and at any one of its blocking positions.

Briefly stated, in accordance with a preferred embodiment of the invention, a star wheel having several radially extending arms is mounted for rotation adjacent the path along which the containers move on a conveyor. A pivoting locking member or lever is mounted adjacent the wheel. In one of its angular positions, the locking member abuts one of the arms of the wheel to prevent it from rotating. At this time, the arm on the wheel that is being blocked and the next consecutive arm on the wheel are both held in a neutral position wherein the arms are outside or entirely clear of the path of the containers on the conveyor. Means are provided for tilting the locking member to remove the end that has been abutting the arm out of the path of the arm and to put the other end of the member in a position for engaging the same arm and locking the wheel against rotation after the wheel has been turned to full locking position under the influence of containers that are moving on the conveyor.

An important feature of the invention is the provision of means for initiating rotation of the star wheel so one of its arms will enter the conveyor path when the wheel is unlocked at one of its several neutral rotational positions. An additional feature is to use the wheel rotation initiating means for the dual purposes of initiating and also providing a retarding force which is great enough to hold the star wheel steadily against free rotation after the arm has entered the conveyor path in the absence of conveyed containers but which force is small enough to be overcome to allow rotation of the wheel through a limited angle at which it becomes locked when it is turned under the influence of moving containers.

In a preferred embodiment, the star wheel rotation initiating and retarding means comprises a plurality of magnetically attractable elements that are fixed equiangularly on the star wheel. A permanent magnet is fixed in the orbital path of the magnetically attractable elements. When the wheel is locked in neutral position, one of the elements is in angular spaced relationship with the magnet. When the wheel is unlocked as a result of the locking member responding to a signal to unlock it, the element is attracted by the magnet and the wheel turns through a predetermined angle at which time an arm of the wheel partially enters the container path. The magnet then holds the wheel steadily in readiness for operating to block. An incoming moving container provides sufficient force to overcome the holding power of the magnet to complete the locking sequence. If the locking member has not been signalled to effect locking at this time, the incoming containers drive the wheel to neutral position again so the containers can pass on the conveyor.

How the objects mentioned above and other more specific objects of the invention are achieved will be evident in the more detailed description of a preferred embodiment of the invention which will now be set forth in reference to the drawing.

DESCRIPTION OF A PREFERRED EMBODIMENT

Figure 1:
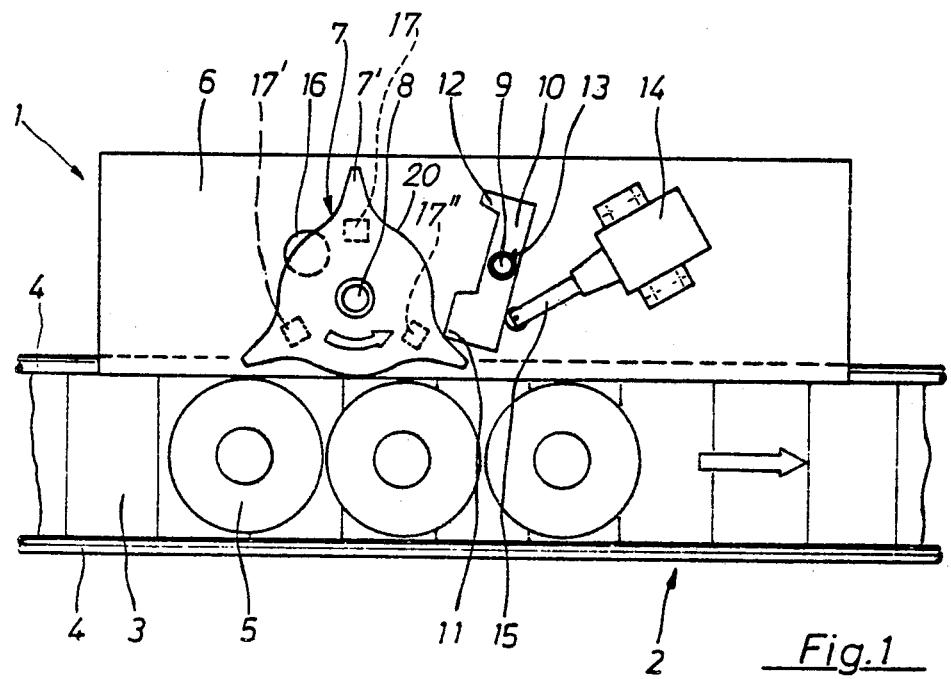
FIG. 1 is a plan view of the blocking device associated with a container conveyor in which view the star wheel of the locking device is locked in a neutral position.

In FIG. 1, the locking device is generally designated by the reference numeral 1 and the conveyor by the reference numeral 2. The conveyor is of the well known hinge-band-chain type. It comprises a series of plates 3 which are hinged to each other to form a closed loop on which containers such as bottles 5 are conveyed in the direction of the arrow toward the inlet of a bottle labeling machine, not shown. A pair of parallel guide rails 4 are affixed along the conveyor to assure that the bottles are confined to moving in a single longitudinal path and are constrained against shifting laterally.

The blocking apparatus 1 comprises a base plate 6 which is fastened laterally of the conveyor on a frame, not shown, that supports the bottle conveyor 2. A star wheel 7 is journaled for rotation on a shaft 8. Star wheel 7, in this particular design, has three equiangularly spaced apart radially extending arms 7'. Between the arms, the margin of the star wheel has a substantially circular contour that is confluent with the margins of the arms. The angular distance between the star arms 7' is relatively large such that it becomes possible to establish star wheel 7 in a neutral position wherein two consecutive arms 7' of the wheel can be positioned adjacent the path of the bottles on the conveyor as shown in FIG. 1. The star wheel 7 is in neutral position in FIG. 1 where one may see that its arms 7' cannot come into contact with the containers passing by on the conveyor.

Figure 2:
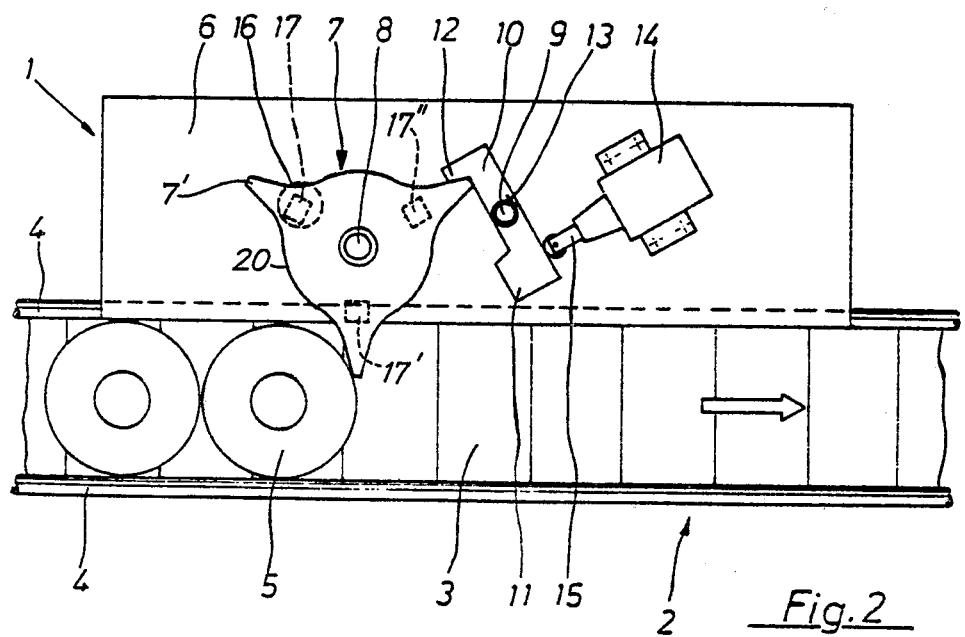
FIG. 2 is a plan view of the same apparatus as in FIG. 1 but showing the container blocking star wheel locked in its blocking position.

FIG. 2 shows the star wheel 7 locked in a rotational position wherein one of its arms 7' projects maximally into the path of bottles 5 on the conveyor to block the bottles against moving along on the conveyor.

Because the arms 7' are equiangularly spaced, three container blocking positions and three neutral positions lying between them can be obtained. Also, since there are three radially extending arms 7' equally spaced and three equally spaced neutral positions of the star wheel, the angle between any neutral position and the next following locked position is about 60°.

The means for selectively locking and unlocking the star wheel at a neutral position and at a container blocking position comprises a locking member in the form of a swingable lever 10 that is mounted for pivoting or tilting on a fixed shaft 9. Opposite ends of swingable locking member 10 are provided with projections or lugs 11 and 12. As shown in FIG. 1, lug 11 is presently abutting an arm 7' of star wheel 7 to prevent rotation of the star wheel in the counterclockwise direction. Lever member 10 is biased for pivoting in a clockwise direction about the axis of shaft 9 by means of a torsion spring 13 whose one end is fastened to the lever member and whose other end is fastened to the shaft. A locking member actuator comprising a pneumatic cylinder 14 and its piston rod or plunger 15 is used for pressing lug 11 of locking member 10 against an arm 7' to secure the star wheel 7 in neutral position as in FIG. 1. In this example, when pressurized air is supplied to cylinder 14, the plunger is extended as in FIG. 1 for pressing against locking member 10 to overcome the counterclockwise torsional force applied to the locking member 10 by torsion spring 13. When occasion arises for assuring that the bottles will be blocked against moving on the conveyor, pressure is automatically relieved in cylinder 14 in which case the torsion spring drives locking lever member 10 counterclockwise and the plunger retracts as shown in FIG. 2 wherein the star wheel 7 is shown locked in container blocking position. Locking is positive because projecting lug 12 stands in the way of the star wheel arm.

Means are provided for initiating rotation of the star wheel from its neutral position as in FIG. 1 to a position wherein one arm of the wheel enters the container path for being moved toward its blocking position as in FIG. 2. The star wheel rotation initiating means comprises three ferromagnetic or magnetically attractable elements 17, 17' and 17" which are fastened to the star wheel. A permanent magnet 16 is mounted in the orbital path of these elements. As is evident in FIG. 1, magnetically attractable element 17 is nearer to permanent magnet 16 than any of the other two elements 17' and 17". Hence, as soon as locking member 10 in FIG. 1 is tilted out of the path of an arm 7', magnet 16 will attract the nearest element 17 and cause the star wheel to rotate counterclockwise at least until element 17 aligns with the magnet. Shortly after the wheel begins to move, an arm 7' of the wheel begins to enter the path of movement of the containers 5 on the conveyor. If a container such as a bottle is then coming along on the conveyor, the arm of the wheel will be in its path in which case the tendency for the container to continue moving on the conveyor will cause the star wheel to rotate to its full locking position in which it is depicted in FIG. 2. At this time, one of the arms is projected maximally into the conveyor path and another of the arms has rotated for being engaged and locked by lug 12 on locking member 10 which was previously tilted and put in readiness for locking the wheel immediately after the wheel was unlocked at its neutral position. If locking member 10 happened to be set in its FIG. 1 angular position at this time under the influence of pneumatic cylinder 14, the star wheel would simply rotate until it attained neutral position in which it would be locked by lug 11 of locking member 10 and the containers could pass. Note that the permanent magnet 16 seeks to rotate the blocking star wheel out of its neutral position to start it into the direction of container transportation.

When circumstances are proper for unblocking the flow of bottles, a signal provided from the machine, not shown, which is supplied from the conveyor causes cylinder 14 to be pressurized to extend its piston rod 15 and cause the locking member 10 to tilt from its FIG. 2 position and unlock star wheel 7 for rotation through an angle of 60 degrees after which it is locked again in neutral position by reason of the locking member 10 having been restored to its FIG. 1 position. During the time between unlocking the wheel from the blocking position as in FIG. 2 and relocking it in its neutral position as in FIG. 1 the wheel is able to rotate because the force of moving containers overcomes the magnetic force applied to the wheel and the containers are free to pass.

It is important to note that the star wheel always travels synchronously with the containers so that annoying clattering of containers such as bottles is prevented and any noise contribution by the blocking device is avoided.

It should be evident that the magnetically attractable elements 17, 17' and 17" could be replaced by magnets and a single magnetically attractable element could be substituted for magnet 16.

Those skilled in the art will appreciate that the concept of a rotation initiating device that permits slippage of the blocking star so that the latter can rotate along with the passing receptacles can be implemented in ways other than with a magnet and magnetically attractable elements that cooperate. For instance, a resilient pressure roll which abuts a cam disk, not shown, fastened to the star wheel could perform the functions obtained with the magnets. Another approach would be to provide a driving connection between the hinged-band-chain conveyor 2 during temporary coupling of an overriding or slipping clutch. Such alternatives are, of course, much more vulnerable to mechanical failure than the simple magnetic arrangement.

It should also be evident that other types of actuators could be substituted for the pneumatic cylinder 14. For instance, a solenoid coil, not shown, with a plunger acting on locking member 10 could be used.

Although a preferred embodiment of the new container blocking and unblocking device has been described in detail, such description is intended to be illustrative rather than limiting, for the invention may be variously embodied and is to be limited only by the claims which follow.

We claim:

1. A device for blocking and unblocking movement of containers that are guided to move along a predetermined path on a conveyor, said device comprising:
   a star wheel mounted for rotation adjacent said path and having radially extending arms,
   means for selectively locking the star wheel against rotation and for releasing said wheel for rotation at two different times, one of which is when said star wheel is in a neutral position wherein the arms are outside of the path of container movement and the other of which is when said star wheel is in a blocking position wherein an arm extends into the path of container movement, and
   means operative when said star wheel is unlocked at neutral position to initiate rotation of the star wheel at least through a sufficient angle for one of its arms to enter said path in the direction of container movement such that if there is a container moving into the one arm it will rotate said star wheel for being locked in blocking position.

2. The device as in claim 1 wherein said means for initiating rotation of said star wheel is operative to apply a small retarding force to said star wheel after it has rotated sufficiently for its arm to enter said path so that said star wheel can rotate under the influence of a container moving on said conveyor but is prevented from rotating by itself.

3. The container as in claim 1 wherein said means for initiating rotation of said star wheel comprises a member fixed in proximity to the star wheel and a plurality of elements mounted to the star wheel and arranged equiangularly about its axis of rotation, said member and the respective elements being mutually magnetically attractive such that the element that is nearest to the member will move toward the member to initiate said rotation when said star wheel is released for rotation at a neutral position.

4. The device as in claim 1 wherein said means for initiating rotation of the star wheel comprises a permanent magnet fixed in proximity to the star wheel and a plurality of magnetically attractable elements mounted to the star wheel and equiangularly arranged about its axis of rotation, releasing said star wheel at its neutral position permitting said magnet to attract the element nearest to it to thereby initiate said rotation of the star wheel.

5. The device as in any of claims 1, 2, 3 or 4 wherein said means for locking and releasing said star wheel comprises a single locking member movable between two positions in one of which it engages said star wheel to lock it in said neutral rotational position and the other of which it engages said star wheel to lock it in one of said other positions after it has rotated from neutral position.

6. The device as in claim 5 wherein:
   said locking member comprises a lever mounted for pivoting about an axis and having lug means respectively on opposite sides of said axis,
   means for pivoting said lever in one direction to an angular position wherein one of the lug means can engage said star wheel to lock it in neutral position, and
   means for pivoting said lever in a direction opposite of said one direction to an angular position wherein the other lug means can engage said star wheel to lock it when it is rotated through a predetermined angle from neutral position under the influence of a moving container.

7. The device as in claim 6 wherein said lug means engage said star wheel by abutting against an arm of the star wheel.

8. The device as in claim 1 wherein neutral positions for said star wheel are defined between each two consecutive angularly spaced apart arms such that the number of neutral positions and blocking positions in which said wheel can be locked each equal the number of arms.

* * * * *